(No Model.) 6 Sheets—Sheet 1.
W. LOWRIE & C. J. HALL.
SECONDARY GENERATOR FOR THE CONVERSION OF ELECTRICAL ENERGY BY INDUCTION.

No. 400,862. Patented Apr. 2, 1889.

Witnesses
Wm M Andrew
A. M. Glass

Inventors.
William Lowrie.
Charles James Hall.
per Fairfax & Netter,
Attorneys.

(No Model.) 6 Sheets—Sheet 2.
W. LOWRIE & C. J. HALL.
SECONDARY GENERATOR FOR THE CONVERSION OF ELECTRICAL ENERGY BY INDUCTION.

No. 400,862. Patented Apr. 2, 1889.

(No Model.) 6 Sheets—Sheet 3.
W. LOWRIE & C. J. HALL.
SECONDARY GENERATOR FOR THE CONVERSION OF ELECTRICAL ENERGY BY INDUCTION.
No. 400,862. Patented Apr. 2, 1889.
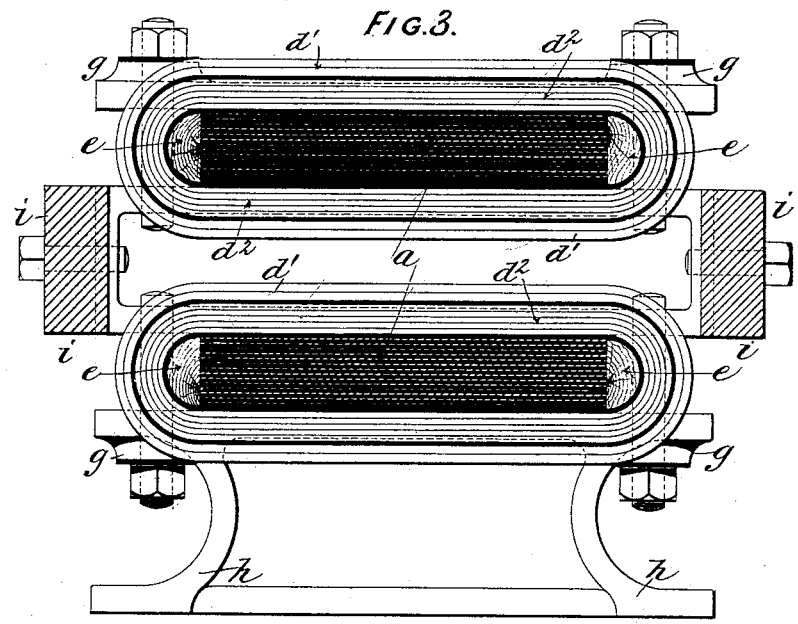
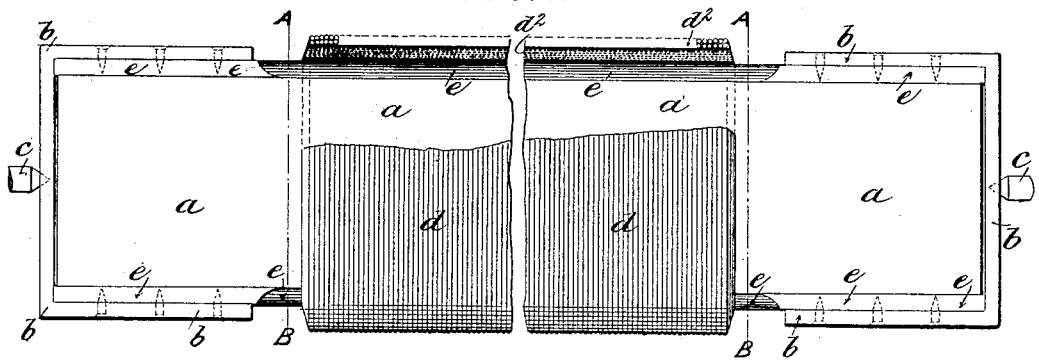
Witnesses.
Wm. M. Andrew
A. M. Glass
Inventors
William Lowrie
Charles James Hall
per Fairfax & Wetter,
Attorneys.

(No Model.) 6 Sheets—Sheet 4.
W. LOWRIE & C. J. HALL.
SECONDARY GENERATOR FOR THE CONVERSION OF ELECTRICAL ENERGY BY INDUCTION.
No. 400,862. Patented Apr. 2, 1889.
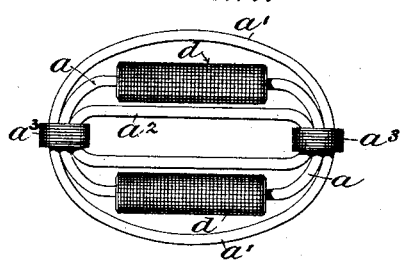
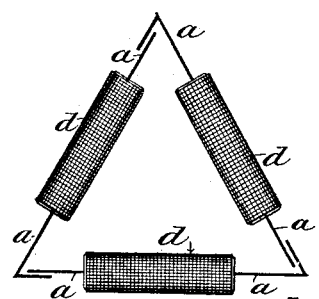
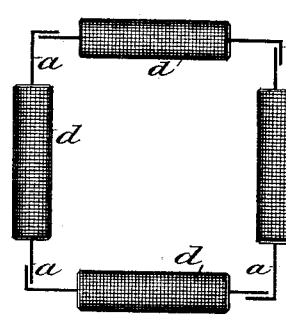
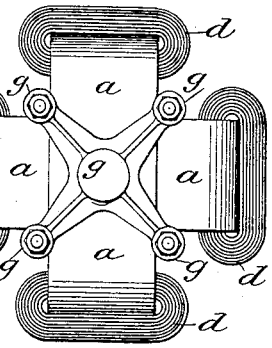
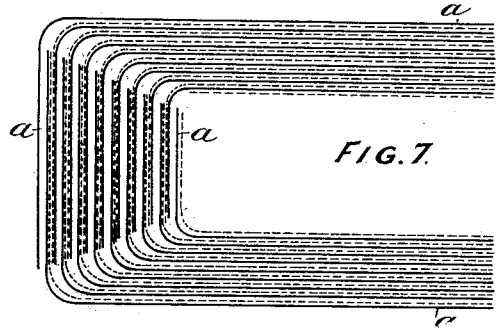
Witnesses.
Wm. M. Andrew.
A. M. Glass
Inventors.
William Lowrie,
Charles James Hall.
per Fairfax & Wetter,
attorneys.

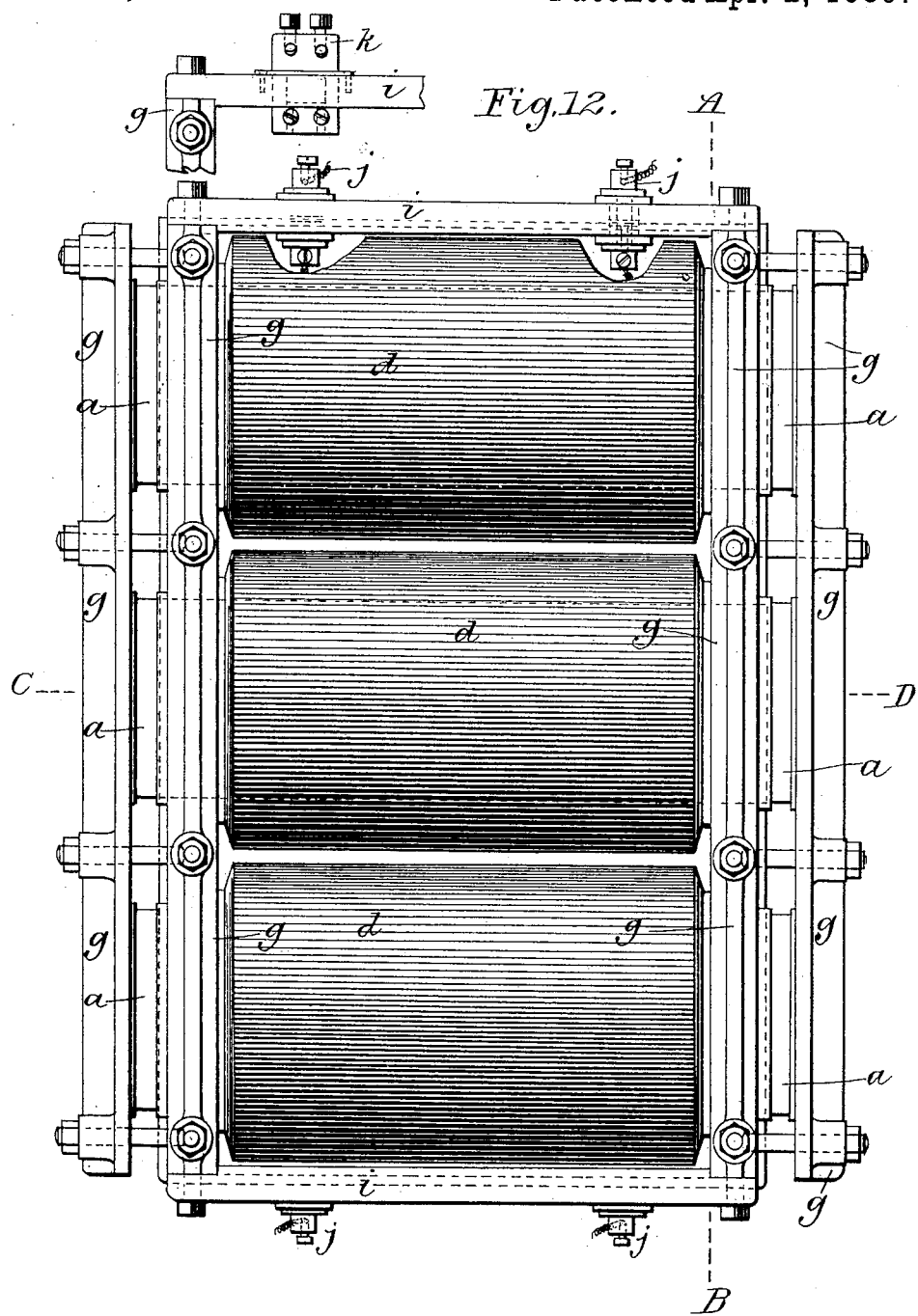

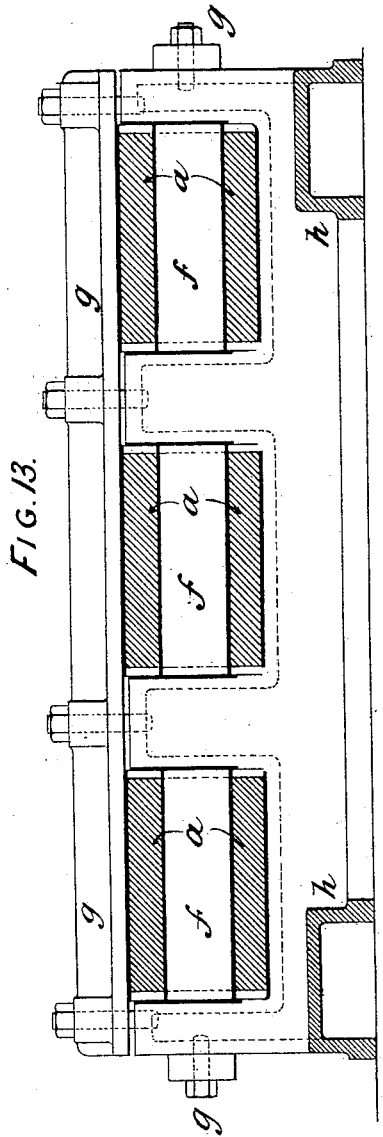

UNITED STATES PATENT OFFICE.

WILLIAM LOWRIE AND CHARLES JAMES HALL, OF LONDON, COUNTY OF MIDDLESEX, ENGLAND.

SECONDARY GENERATOR FOR THE CONVERSION OF ELECTRICAL ENERGY BY INDUCTION.

SPECIFICATION forming part of Letters Patent No. 400,862, dated April 2, 1889.

Application filed May 24, 1887. Serial No. 239,266. (No model.) Patented in England August 23, 1886, No. 10,765; in France May 28, 1887, No. 183,876; in Belgium May 28, 1887, No. 77,639, and in Italy December 31, 1887, XXI, 22,594, XLIV, 898.

*To all whom it may concern:*

Be it known that we, WILLIAM LOWRIE and CHARLES JAMES HALL, subjects of the Queen of the United Kingdom of Great Britain and Ireland, and residents of London, in the county of Middlesex, England, have invented certain new and useful Improvements in Secondary Generators for the Conversion of Electrical Energy by Induction, (Letters Patent for which have been granted in Great Britain, August 23, 1886, No. 10,765; France, May 28, 1887, No. 183,876; Belgium, May 28, 1887, No. 77,639, and Italy, December 31, 1887, No. 22,594, Registro Generale, Vol. XXI, and No. 398, Registro Attestati, Vol. XLIV,) of which the following is a specification.

Our invention relates to the conversion of electrical energy from one state or condition of potential to another by induction, according to the researches and discoveries of Faraday.

The invention consists in the construction of the secondary generators or induction apparatus employed in the process of conversion.

Our apparatus is constructed in the following manner: We form two cores of thin soft iron plates of square or rectangular form, which are built up and insulated from each other in order to avoid the formation of wasteful Foucault currents. On the central portion of each core are wound a primary and a secondary coil of insulated conductor, leaving portions of the core projecting outward at each end. The two cores, with their coils, are mounted parallel to each other at a short distance apart, and the several projecting plates are alternately bent over a distance-block at each end, and lapped over each other, so that each pair of plates form an oblong ring and closed magnetic circuit insulated from the rest. To insure good magnetic contacts, the whole of the lapped plates are tightly clamped together by bolts and plates, although other means of fastening them together may be adopted. These couples thus connected may be regarded as unit couples. Any number of them may be employed, according to the size of the apparatus required, the kind of service, the size of plates or coils adopted, the position occupied, or other practical considerations, and their coils may be connected in series or divided into sections and connected in parallel or otherwise to suit the kind of conversion desired.

The plates which are used to make up the iron cores can be made of such dimensions, either square or rectangular, that the required length of wire may be wound thereon in two layers; but if more than two layers are employed we prefer to have as few as possible. When two layers are used, one layer would form the primary coil and the other the secondary coil. It is immaterial which coil is wound upon the core first; but either the primary or the secondary coil must be superimposed upon the other. Where more than two layers are used, the primary and the secondary coils may be wound in alternate superposed layers; but it is more convenient to finish the winding of the first coil before beginning to wind the second. The coils are of double-covered-cotton wire or insulated copper tape; but it will be understood that other methods of insulation or forms of conductor may be used. Each layer and coil must be well insulated from the others, and the ends of the coils are brought to the exterior and suitably connected.

Reference is made to the annexed drawings, in which—

Figure 1 is a plan, one-half in horizontal section along the line of Y Z in Fig. 2, which represents a vertical section. Fig. 3 is a transverse section of our apparatus, drawn to a larger scale. Fig. 4 indicates the manner in which the core-plates *a* are placed within clamps *b b*, suspended within or between lathe centers *c c*, in order to wind the coils *d*. Before placing the core-plates *a* in the clamps the edges of the plates are stiffened by wooden strips *e e* on each side of the plates. The central part of the wood strips is rounded to make the bend of the wire easy over the edge of the plates, and the strips serve also to keep the plates in position and to stiffen the coils when completed. The clamps are screwed to the wood strips at the ends, and after the coils have been wound the wood strips are sawed through at the points marked A A and B B, thus leaving in position only those portions of the strips held by the coils.

Fig. 5 is a cross-section of the core-plates $a$, which are placed one over the other, insulated from each other, and secured upon their edges by the strip of wood or other insulating material just described. This figure shows the strips $e$ with the clamp $b$ in position ready for the winding of the coils, as before stated.

In Fig. 6 the same arrangement of core-plates is shown, but with the exception that the two outer plates are wider and turned over the edges of the others for stiffening purposes, and the wood strips are dispensed with.

It will be seen that other plans may be adopted of a like nature to effect the same result.

The several plates are insulated from each other in any convenient manner; but we prefer the following method: One side of each plate is coated throughout with a solution of shellac or other suitable substance, and upon this we place a layer of some open-work fabric—such as that known as "book-muslin"—and cause it to adhere by the application of heat and pressure. The plates are arranged in regular order one above another, each insulated side of a plate being placed next to the uncoated side of the plate adjoining until the requisite number is attained to form each core. The insulated or stiffening strips are now placed upon each side or edge of the plates, the clamps placed in position, and the core is now wound, as before stated. Two straight cores having thus been wound with their coils are placed in position ready to be joined together.

In Fig. 2, $a\ a$ represent the cores, $d'$ the primary coils, and $d^2$ the secondary coils. At the ends of the coils and between the cores are placed distance-blocks $f$, and, beginning with the inner ones, each plate of each core is bent over the distance-blocks $f$ alternately, so that the projecting ends lap over one upon another, the uncoated side of one plate being in metallic contact with the uncoated side of its fellow plate, as shown by the diagram, Fig. 7. This diagram further shows by dotted lines the double layers of insulation between the plates where the coated sides come in contact with each other, and, as the diagram is drawn to show one-half, it will be seen that when each pair of plates at each end of the cores are brought together an elongated ring or ring with flattened sides is formed, composed of a series of independent magnetic circuits, in which lines of force are free to circulate without forming poles. When the plates are thus lapped over to form an elongated ring-core, insulated clamping bolts, plates, and nuts $g\ g$ are used to insure good magnetic contact with stability, the clamping devices $g$ being attached to the distance-blocks $f$, standards or supports $h$, and to side frames, $i$, of wood or some other suitable insulating material. Upon these side frames are mounted suitable terminals, $j\ j$ and $k\ k$, to which the circuit-connections are attached.

Fig. 8 is a diagram of an arrangement of three coils, showing by a thick line their cores and the manner in which their ends may be clamped together or otherwise connected. Fig. 9 is a similar diagram of four coils, and either of these arrangements may be carried out according to our invention and the coils placed either vertically or horizontally; but we prefer to make our apparatus in the form of a unit pair or any multiple thereof, the axis of the coils being in either a horizontal or a vertical plane, as may be most convenient.

Fig. 11 indicates a vertical arrangement of two unit pairs, the cores being bent at the top and bottom and clamped together in the form of a cross. In this form the clamping devices extend diagonally across the angles, and bolt heads or feet at the bottom form a base to stand upon.

Fig. 12 is a plan of a secondary generator or induction apparatus of three unit pairs which embodies our invention.

Fig. 13 is a longitudinal section along the line A B, and Fig. 14 a transverse section on the line C D of Fig. 12.

Figure 1:
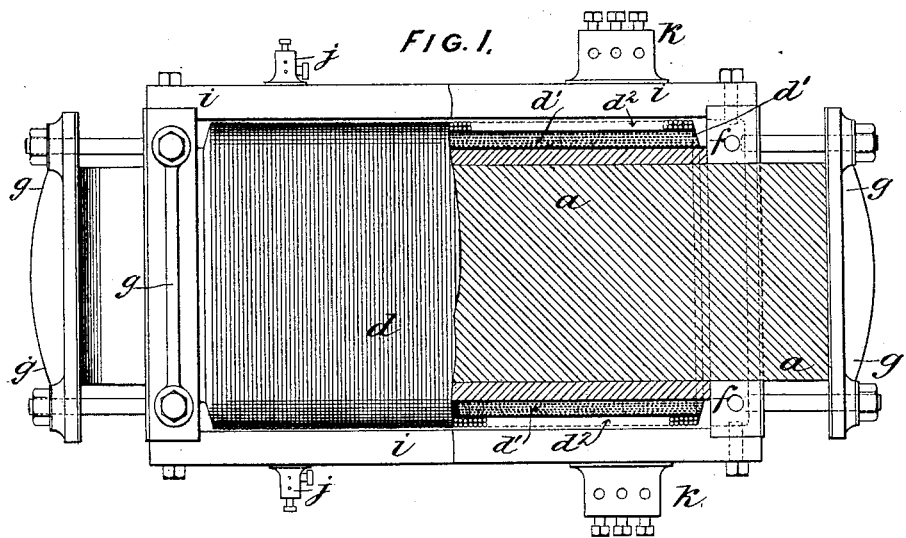
Figure 2:
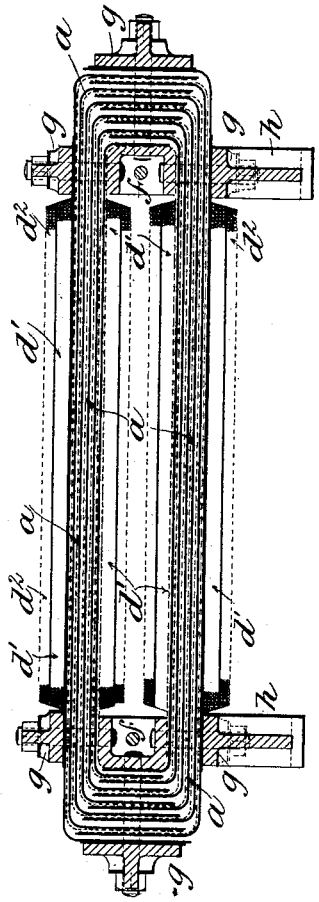
Figure 14:
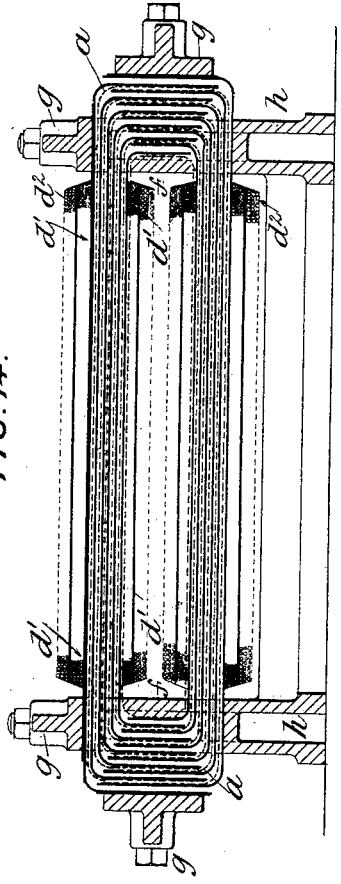

The principal parts insulated are shown by heavy black lines in Figs. 13 and 14, and it will be understood that the plates, bolts, and nuts of the clamping devices $g$ or any other parts requiring the same will be suitably insulated.

Any number of pairs may be combined in the same apparatus, and any one of the group can be cut out while the apparatus is in action without detriment to the remainder.

The coils employed are suitably connected to suit the kind of conversion or change of potential required.

An apparatus comprising three unit pairs or complete magnetic circuits, in which six sets of double coils are employed, is shown by Figs. 12, 13, and 14. Each of the six primary coils ($d'$, Fig. 14) represent three layers of insulated copper wire of No. 14 Birmingham wire-gage, and the whole of the eighteen layers of wire are intended to be connected together in series in the manner well known to electrical engineers. Each of the six secondary coils ($d^2$, Fig. 14) also consists of three layers of the same size conductor, each secondary coil being superposed upon its corresponding primary coil, and the whole of the eighteen layers of secondary wire is likewise intended to be connected in parallel in the manner practiced by electrical engineers. By means of this apparatus, connected in the manner indicated, the potential of the primary or exciting current is reduced from eighteen hundred volts to one hundred volts.

The conductors used may be the usual double-covered wire; but copper tape suitably insulated may be used instead. If carefully wound and insulated between the layers and adjoining strands, the copper tape may be bare.

The manner in which the ends of the primary coils and the ends of the secondary coils are led to the terminals and connected in series and in parallel, respectively, is so well known to electrical engineers that it is not considered necessary to show the same upon the drawings.

An important feature of our invention consists in the shape of the plates which form the core. By making the plates square or rectangular in form and regulating their number or aggregate thickness we are enabled to provide exactly for any length of conductor required without undue weight of core, and we also reduce to a minimum the length, and therefore the resistance, of the magnetic circuit. It will be observed that each core or assemblage of completed magnetic circuits has two or more flat sides, as exemplified in Figs. 8 and 9. Other geometrical forms of a similar nature may be employed.

In Fig. 11 the complete magnetic circuit takes the form of two elongated rings or links, the respective planes of which are arranged at right angles to each other, but magnetically connected together at the center of their ends. This form is therefore that of two unit pairs combined; and it being more convenient to describe and claim the same in this sense it is to be understood that our improved method of forming closed magnetic circuits consists of an assemblage of thin iron plates of square or rectangular shape, originally straight, bent, or otherwise connected at the ends by clamping devices and distance-blocks, and having two or more straight sides, upon which the primary and secondary coils are mounted and through which the iron core passes. The unit pair is therefore in its simplest form an elongated or flat-sided ring, each of the opposite flat sides having the double coils wound thereon, and the ends of the core-plates being closed or connected together as close to the coils as is practicable in order to reduce the length and weight of the magnetic core.

In Fig. 10 coils $d\ d$ are mounted upon a magnetic core, $a$, of an elongated ring shape, but surrounding the outer part of the coils and placed within are two other magnetic cores, marked $a'$ and $a^2$, respectively, which we find are practically useless unless they are all magnetically connected together at $a^3$, as shown in the diagram.

By our method of forming the core we cause the whole of the magnetic currents circulating through the magnetic circuit to pass through the interior of the coils, we reduce the length of the said circuit to a minimum, we lessen the magnetic resistance and cost of construction, and obtain, generally, a better result from the apparatus.

Having now fully described our invention, what we claim, and desire to secure by Letters Patent of the United States, is—

1. A secondary generator or induction apparatus comprising one or more unit pairs of straight magnetic cores, each core being separately built up of flat thin plates square or rectangular in shape without re-entering angles, and having centrally mounted thereon superposed primary and secondary coils, a pair of the said straight cores being subsequently magnetically and mechanically united close to the coils by bending and alternately overlapping the extended ends of the several plates and clamping them together in the form of an elongated link, substantially as and for the purpose described.

2. In a secondary generator, the combination of a magnetic core composed of thin flat plates in the shape of a solid square or rectangle, with strips rounded upon their outer edges adapted to stiffen the said core-plates and to receive coils wound thereon, the ends of the said strips being cut away close to the coils, substantially as and for the purpose described.

3. In a secondary generator, the combination of two or more laminated magnetic cores, forming a complete magnetic circuit with flattened sides, on each of which are mounted superposed primary and secondary straight-wound coils, the junctions of the core ends being effected by bending, overlapping, and clamping the plates of the said cores, substantially as described.

4. In a secondary generator, the combination of two straight magnetic cores, each core composed of thin flat plates of square or rectangular form without re-entering angles, having mounted upon the central part of each core superposed primary and secondary coils, each end of each core being magnetically joined to the corresponding end of the other core, close to the said coils, in the form of a link with straight sides, substantially as and for the purpose set forth.

5. In combination, two or more magnetic cores of square or rectangular shaped plates without re-entering angles, superposed primary and secondary coils on central part of each core, alternately-lapped ends of protruding component core-plates close to coils, with the corresponding plates in adjoining core or cores in magnetically-continuous layers, and clamping devices at the junction of said plate ends, substantially as and for the purpose set forth.

6. Two or more laminated iron cores of square or rectangular shape without re-entering angles, and having superposed coils wound or mounted thereon, combined with distance pieces or blocks adapted to receive the end portions of the cores, and clamping devices to clamp the blocks and cores together in their relative positions, substantially as described.

7. In combination, two or more magnetic cores of square or rectangular shaped plates without re-entering angles, primary and secondary coils centrally mounted thereon, a frame or frames adapted to receive the said cores, and bolts, nuts, and plates adapted to clamp together the several plate ends in closed magnetic circuits without perforating the said ends, substantially as and for the purpose described.

In testimony that we claim the foregoing as our invention we have signed our names, in the presence of two witnesses, this 9th day of May, 1887.

WILLIAM LOWRIE.
CHARLES JAMES HALL.

Witnesses:
ERNEST GAYES,
CHAS. ROCHE.